Figure 1:
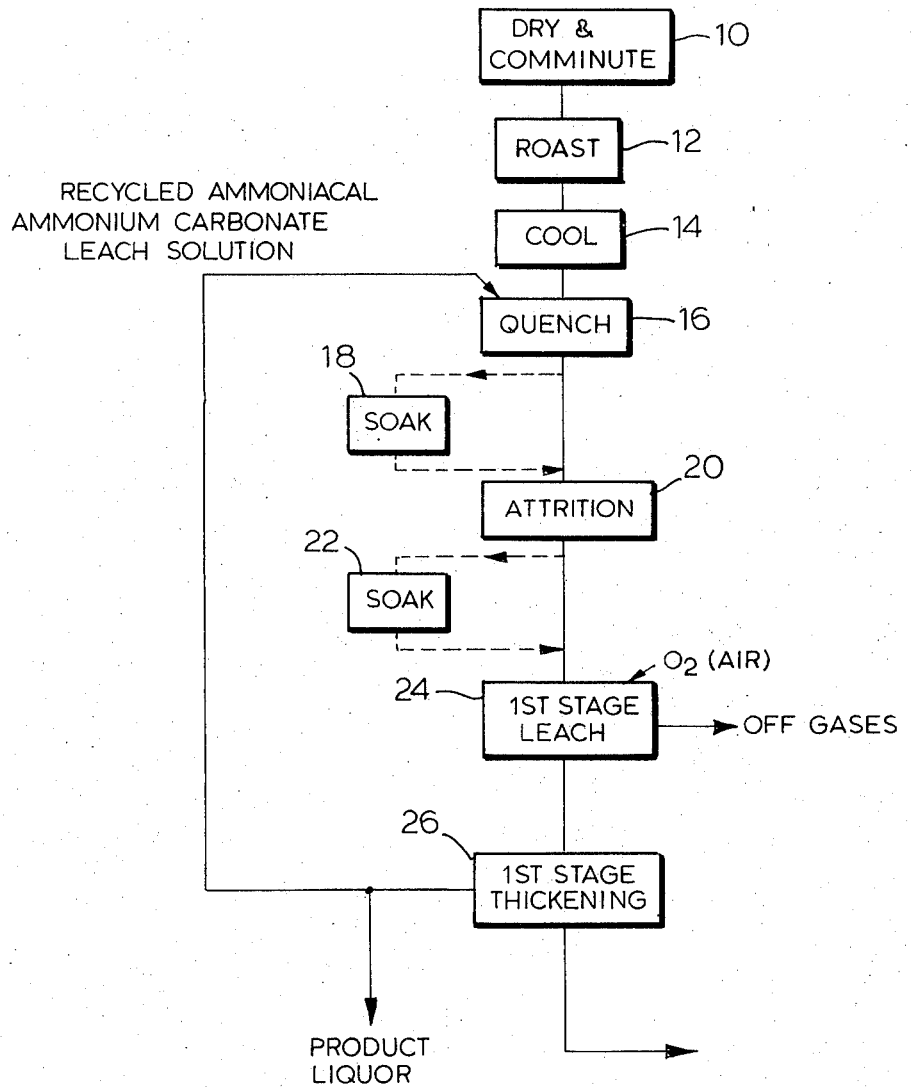

United States Patent [19]

Sefton et al.

[11] 3,860,689

[45] Jan. 14, 1975

[54] PROCESS FOR TREATING HIGH MAGNESIUM NICKELIFEROUS LATERITES AND GARNIERITES

[75] Inventors: Verner Blakey Sefton, Edmonton; David John Ivor Evans, North Edmonton; Donald Robert Weir, Fort Saskatchewan, all of Alberta, Canada

[73] Assignee: Sherritt Gordon Mines Limited, Toronto, Province of Ontario, Canada

[22] Filed: July 19, 1973

[21] Appl. No.: 380,936

[52] U.S. Cl.................. 423/150, 75/103, 75/119
[51] Int. Cl............................................ C22b 23/04
[58] Field of Search.................. 75/119, 103, 101 R; 423/150

[56] References Cited
UNITED STATES PATENTS

| | | | |
|---|---|---|---|
| 1,212,334 | 1/1917 | Eustis | 75/119 |
| 1,487,145 | 3/1924 | Caron | 423/144 |
| 3,100,700 | 8/1963 | Hills | 75/103 |
| 3,644,114 | 2/1972 | Vosahlova et al. | 423/150 |

*Primary Examiner*—Oscar R. Vertiz
*Assistant Examiner*—Brian E. Hearn
*Attorney, Agent, or Firm*—Frank I. Piper; Arne I. Fors; James T. Wilbur

[57] ABSTRACT

A method of improving the responsiveness of high magnesium nickeliferous lateritic and garnieritic ores to the known reduction roast ammonium carbonate leach process. According to the method, following reduction roasting and quenching of the ore particles, they are subjected to attrition in order to rub off an outer layer therefrom and to expose surfaces beneath the layer to penetration by the quench solution whereby the proportion of nickel extracted by subsequent leaching of the particles is substantially increased. Optionally before or after attrition the particles are soaked in quiescent non-oxidizing ammoniacal ammonium carbonate solution. A sulphur-bearing additive may also be combined with the ore particles prior to reduction roasting.

12 Claims, 2 Drawing Figures

PROCESS FOR TREATING HIGH MAGNESIUM NICKELIFEROUS LATERITES AND GARNIERITES

This invention relates to the recovery of nickel from nickel-bearing laterite and garnierite ores. More particularly the invention relates to an improvement in the known reduction roast ammonium carbonate leach process which permits treatment of nickeliferous laterite and garnierite ores having a relatively high magnesium content whereby a substantially improved yield of nickel may be obtained therefrom.

One process employed in the treatment of nickel and cobalt - bearing lateritic and garnieritic ores known as the Nicaro process involves roasting the ore under reducing conditions to reduce selectively nickel and cobalt oxides in the material to a crude metallic state, quenching and then leaching the reduced material with ammoniacal ammonium carbonate solution. Leaching is carried out under oxidizing conditions to extract the nickel and cobalt values. The nickel and cobalt values are recovered from the leach liquor by boiling the solution to drive off ammonia and carbon dioxide in order to cause dissolved nickel and cobalt to precipitate in the form of basic carbonate compounds. The precipitate is then heated to convert it to a mixed nickel-cobalt oxide product.

Since the time when the Nicaro process was first carried out on a commercial scale a number of improvements have been made to it. In for example U.S. Pat. No. 3,640,706 and Canadian Pat. No. 854,116, procedures are described for overcoming the problem of contamination of the final nickel product by cobalt and such other impurities as magnesium, manganese and copper. In U.S. Pat. No. 3,644,114 a method is described for causing substantially all magnesium present in lateritic ore to precipitate during the leaching operation where it can be removed without difficulty. Hitherto a large proportion of the magnesium values had deposited on the inside wall of the pipes and processing vessels. As a result, it was necessary to shut down the apparatus periodically to permit removal of the magnesium deposit.

Where the ore being treated is a so-called "limonitic" laterite which has a relatively low magnesium content the proportion of nickel which can be recovered by the improvements to the Nicaro process mentioned above is very high. Where, however, the magnesium content of the ore being treated is relatively high i.e. 5 percent or higher by weight, the proportion of nickel which can be recovered by the improvements is significantly lower. Lower recoveries of nickel, of course reflect unfavourably on the economics of these improved processes as applied to high magnesium nickeliferous laterites and garnierites.

The present process provides a method by which substantially more nickel can be recovered from laterite and garnierite ore containing about 5 percent magnesium or more than can be recovered by the Nicaro process and the improvements mentioned before. It has been found that the extraction of nickel from such ores by leaching can be greatly improved if the ore is subjected to attrition after the roasting and quenching operations and prior to the final leaching operation. Furthermore, if the ore particles are allowed to soak for an extended period of time in ammoniacal ammonium carbonate solution before or after they are subjected to attrition, even better extractions of nickel are achieved.

Attrition and soaking, it is believed, serve to break down complex magnesium carbonates which apparently interfere with the leaching operation. These magnesium complexes possibly in the form of x $Mg(OH)_2$.y $MgCO_3$ (basic magnesium carbonate) or $MgCO_3.(NH_4)_2CO_3.4H_2O$ are derived from magnesium values in a portion of the ore which produces active magnesium oxide during the roasting operation. When the active oxide contacts the ammoniacal ammonium carbonate quench solution, it converts to the complex forms mentioned above and apparently these complexes coat the outer surfaces and the interstices of the ore particles. The coating acts as a diffusion barrier and prevents the penetration of the leach solution and oxygen into the particles and the diffusion of nickel values out of them. As a result, the particles are incompletely leached and a substantial proportion of their nickel values remains out of contact with the leach solution.

Attrition, it is believed, serves to rub or scuff off the complex magnesium carbonate coating from the particles and to expose the surfaces of the reduced ore beneath the coating. The leach solution may penetrate these surfaces and substantially more nickel is extracted from the ore than is the case where the ore is not subjected to attrition. Attrition also, it is believed, exposes fresh basic magnesium carbonate to the leach solution. Some of the fresh carbonate dissolves in the solution and later recrystallizes as discrete particles of magnesium ammonium carbonate free of nickel. In such form the magnesium does not interfere with the leaching of the nickel-containing ore particles.

Soaking serves to enhance nickel extraction because apparently it renders the attrition operation more effective to remove the carbonate coating. In addition to providing the time for some of the freshly exposed basic magnesium carbonate to dissolve in the solution, prolonged soaking of the coated ore particles in ammoniacal ammonium carbonate solution also, it is believed, causes some of the complex magnesium carbonates to convert to a crystalline form which is quite brittle and which can be more readily scuffed or rubbed off by attrition than can the form of the complex carbonate prior to soaking. Soaking is also believed to allow time for leached nickel values in the ore particles to diffuse through the carbonate coating and desorb.

The present invention therefore involves an improved method for increasing the extraction of nickel from nickeliferous laterite and garnierite ores containing in excess of about 5 percent magnesium. Specifically the invention is an improvement to the process in which nickeliferous lateritic and garnieritic ore particles containing in excess of about 5 percent magnesium by weight are treated to reduce nickel values therein to metallic form and the reduced particles are quenched in an aqueous ammoniacal ammonium carbonate solution then are leached with a like solution in the presence of free oxygen to extract nickel values and dissolve them in the leach solution. The improvement comprises subjecting quenched particles to attrition in order to rub off an outer layer therefrom and to expose surfaces beneath the layer to penetration by the solution whereby the proportion of nickel extraction in the leaching operation is substantially increased.

Figure 2:
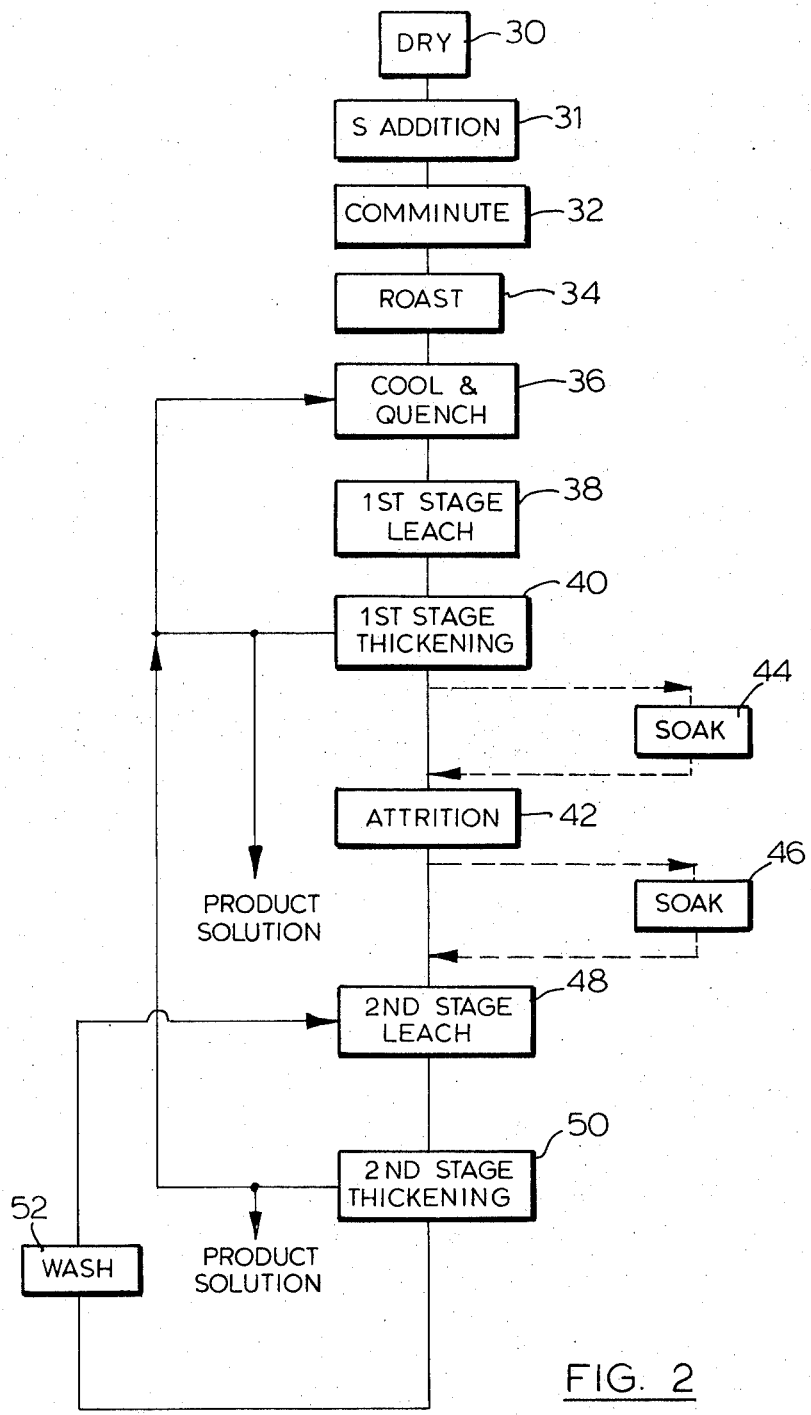

The process of the invention is described in detail below with reference to the accompanying drawings in which FIGS. 1 and 2 are flow-schemes of two processes incorporating the improvement of the present invention.

The process of the invention is intended to be incorporated into the known hydrometallurgical method for treating laterite and garnierite ores. For a description in detail of such method reference may be had to numerous patents such as Canadian Pat. No. 811,078 and U.S. Pat. No. 3,640,706.

The particular ores contemplated for treatment by the process of the invention are primarily those laterite and garnierite ores containing in excess of about 5 percent by weight magnesium as well as economically recoverable amounts of nickel and optionally cobalt. The ores may be so-called "serpentinic or garnieritic" ores which normally contain from about 20 to 38 percent MgO or they may be blends of serpentine or garnierite with so-called "limonitic" laterite ores. The blends will also contain in excess of 5 percent magnesium and since limonite typically contain no more than about 0.6 percent by weight magnesium, the blends will be made up largely of serpentine or garnierite which have a higher magnesium content. Ores of these types occur in large deposits in Cuba, Venezuela, New Caledonia and the Philippines, for example.

With reference to FIg. 1, ore is dried by known procedures at 10 to lower its moisture content to below about 5 percent then is ground to substantially 100 percent minus 100 mesh standard Tyler screen. The ore is passed to roasting step 12 where it is heated under controlled conditions in contact with reducing agents preferably hydrogen or carbon monoxide or mixtures thereof. The ore may be heated in a multiple hearth furnace, a rotary kiln or a fluo-solids roaster. The ore is, in general, heated to a temperature in the range of 1025°F. to about 1600°F. preferably to between about 1250°F. to about 1400°F. and is maintained at that temperature to reduce the nickel and cobalt oxides in the ore to a metallic state with minimum accompanying reduction of iron oxide to metallic iron and ferrous iron (wustite phase). A preferred method for conducting the roasting operation is described in detail in co-pending U.S. application No. 152,233 filed June 11, 1971 now allowed.

Reduced ore discharged from the furnace is cooled at 14 preferably to about 300°F. then is passed to quench step 16 where it is quenched in recycled ammoniacal ammonium carbonaate solution from the first stage thickener 26. Following quenching the ore can be soaked at 18 in the ammoniacal ammonium carbonate quench solution. The solution differs from the solution in which subsequent leaching occurs in that the soaking solution is substantially quiescent and is maintained under nonoxidizing conditions. In other respects, however, the solution is the same as the leach solution. Soaking may be carried out in an autoclave or other closed vessel and is continued for at least about 3 hours and preferably for about 12 hours or longer.

The slurry containing quenched and optionally soaked reduced particles is then passed to an attrition step at 20. The purpose of this step is to rub or scuff off the outer layer of complex magnesium carbonates from the ore particles and to expose the surfaces beneath this layer. Attrition can be carried out in a ball mill, a rod mill, a tube mill or a vessel in which sustained agitation of the particles takes place. The slurry can be exposed to an oxygen-containing gas during attrition. Exposure to oxygen at this time will result in some leaching of the ore particles and hence will shorten the time required in the subsequent leaching step to obtain optimum extraction of nickel values.

Whatever device is employed for attrition, its speed should be controlled such that it causes ore particles to remain in rubbing contact with each other or with grinding balls or rods. The device need not be operated at such speed that it grinds or breaks the particles into a highly comminuted product.

Because of rubbing contact of the particles in the attrition step, material will be continuously abraded from the outer layer of the particles. Ideally upon completion of the attrition operation the outer surfaces of the particles will be substantially free of complex magnesium carbonates. If attrition is carried out in a ball mill, the operation in general should be continued for 2 to 30 minutes whereas if attrition is carried out in an agitated vessel the operation should generally last for about 2 hours. If, however, the magnesium content of the ore is very high and hence the outer layer of complex magnesium carbonates relatively thick, a longer period of attrition may be necessary.

Optionally, following attrition step 20, the ore particles are again soaked at 22. The soaking operation is carried out in the same way as at 18. Soaking is an optional but preferred procedure in the context of the subject invention. Soaking may precede or follow attrition or it may be carried out both before and after attrition.

Following the second soaking stage 22, the slurry of ore particles and ammoniacal ammonium carbonate solution is passed to first stage leach 24 where it is contacted with oxygen bearing gas in order to extract the nickel values from the ore particles and to dissolve them in solution. Leaching is carried out according to known procedures such as are described in U.S. Pat. No. 3,644,114. Following leaching the slurry is passed to first stage thickener 26. Part of the thickener overflow solution is recycled to the quench tank 16 and the balance, containing dissolved nickel values can be treated for recovery of nickel according to the method described in U.S. Pat. No. 3,640,706 or other known methods.

The process of FIG. 2 differs from that in FIG. 1 in that the quenched ore particles are subjected to a preliminary leaching operation before they are subjected to attrition. A preliminary leach has the advantage of converting metallic nickel in the quenched particles to a form in which it more readily diffuses through the complex magnesium carbonate coating and desorbs. Leaching, prior to attrition, in general results in improved nickel extraction and accordingly is a preferred procedure in the context of the present invention. The scheme of FIG. 2 also includes the step of combining a sulphur-bearing compound with the ore particles before they are reduction roasted. During roasting, the compound apparently inhibits formation of refractory nickeliferous magnesium compounds which would decrease the recovery of nickel during the subsequent leaching operation.

With reference to FIG. 2, a sulphur-bearing additive is combined with the ore passing from the drying step 30 at 31. Preferably, sufficient additive is combined with the ore to provide a mixture having a total sulphur content of between about 0.2 and 5 percent by weight. In general, if much less than about 0.2 percent sulphur is added to the ore the additive has no discernible effect on the amount of nickel extracted. Where the ore mixture contains increasing amounts of additive above 5 percent total sulphur, the nickel extraction tends to level off.

Suitable additives include pyrrhotite, pyrite, sulphur-containing fuels, magnesium sulphate, sulphuric acid, hydrogen sulphide, elemental sulphur or sulphur dioxide. The additive should not of course contain material which will interfere with the subsequent leaching operation or which will contaminate the final nickel product. Pyrite is a particularly suitable additive for purposes of the present invention since it is easy to store, has a high sulphur content per pound and is usually relatively cheap.

Following addition of the sulphur-bearing compound, the ore mixture is passed to comminution step 32 which is conducted in the same way as in FIG. 1. As well as serving to reduce the state of subdivision of the mixture, the comminution step serves to mix intimately the ore particles and the additive. Following step 32, the ore is roasted at 34 in the same way as in FIG. 1. The roasted ore is cooled and quenched at 36 then is passed to a first stage leaching step at 38. The conditions of the leaching step are the same as those of the first stage leach 24 of FIG. 1 except that leaching is terminated well before the time required to obtain complete extraction of nickel values. Following step 38, the leach slurry is passed to a thickener 40. Underflow slurry from the thickener 40 is passed to an attrition step at 42 while part of the overflow is recycled to quench 36 and the balance is treated for recovery of nickel values by known procedures.

Optionally, prior to attrition step 42, the underflow from thickener 40 is soaked at 44 for a period of time in quiescent oxygen-free ammonium carbonate solution. Also following attrition the solids may be soaked at 46. Soaking before or after attrition step 42 results in conversion of complex magnesium carbonates to a form in which they do not interfere with the second stage leaching step. In addition, soaking provides the opportunity for nickel to diffuse through the carbonate coating and desorb.

Slurry from step 42 or 46 is passed to a second leach stage 48 and slurry discharged from stage 48 is passed to thickener 50. Overflow solution from thickener 50 is recycled partly to quench 36 while the remainder is recovered for further treatment for recovery of nickel. The underflow slurry from thickener 50 is washed with ammonium carbonate make-up solution in washing operation 52 and the wash solution is recycled to the second stage leaching operation 48.

It should be noted that the benefits from the sulphur-bearing additive may be realized not only when the starting ore is treated according to procedure of FIG. 2 but also when treated according to scheme of FIG. 1. In both schemes the additive is preferably combined with the ore prior to the comminution step.

EXAMPLE 1

Two samples of garnierite from New Caledonia each 80 percent minus 200 mesh standard Tyler screen in size were used as the starting material for this example. The first sample analyzed 1.95% Ni, 13.1% Fe, and 19.8% Mg and the second sample analyzed 1.9% Ni, 9.9% Fe and 20% Mg.

The first sample was subjected to attrition in a ball mill to reduce its state of subdivision to 100 percent minus 400 mesh. The material was then roasted in a furnace under reducing conditions at a temperature of 1400°F. for 1 ½ hours, discharged from the furnace, cooled to 400°F then quenched and leached in ammoniacal ammonium carbonate solution. 61.6 percent of the nickel values was extracted by leaching.

The second sample was roasted in a furnace at a temperature of 1,300°F. in a reducing atmosphere for 1 ½ hours, cooled to 300°F. then quenched in ammoniacal ammonium carbonate solution. The quenched material was then subjected to attrition in a ball mill to decrease its size to 100 percent minus 400 mesh. The material was then leached under the same conditions as the first sample. 76 percent of the nickel values was extracted.

It can be concluded from a comparison of the nickel extractions from the two samples that the present process is not simply a method of increasing the proportion of nickel extracted from ore particles by grinding the particles to decrease their size. If this were the case the extractions from the two samples should be substantially the same. Instead the extraction from the second sample which was treated by the process of the invention is better by more than 15 percent than the extraction from the first sample which was not so treated. Thus it is not attrition per se which gives rise to improved nickel extraction. For the benefits to be realized from attrition, it must occur after and not before roasting.

It should be noted that the difference between the nickel extractions from the first and second samples cannot be attributed to the differing nature of the ore samples and the roasting temperatures. In general, the lower the iron content and the lower the roasting temperature below 1,400°F., the lower will be the nickel extraction. Accordingly the extraction of nickel from Sample 2 which had a lower iron content and was roasted at a lower temperature than Sample 1 should have been lower than from Sample 1. In fact it was higher, therefore attrition clearly had an effect on the nickel extraction.

EXAMPLE 2

Samples were prepared from a Venezuelan serpentine laterite ore. The ore analyzed (weighted average) 1.52% Ni, 0.049% Co, 18.8% Fe, 14.2% Mg. A small quantity of pyrite was blended with some of the samples prior to roasting. The samples were roasted under varying conditions, cooled then quenched. The quenched samples were divided into four groups and were treated as follows:

| | |
|---|---|
| Group 1: | attrition for ½ hour in ball mill; leached for 3 hours; soaked for 18-24 hours; and leached for 1 hour (abbreviated to BLSL in the following table). |
| Group 2: | leached for 3 hours; attrition for ½ hour; soaked 18-24 hours; leached 1 hour (abbreviated to LBSL). |
| Group 3: | attrition for ½ hour; leached 3 hours (abbreviated to BL). |
| Group 4: | leached for 3 hours (abbreviated to NL). |

The precentage of nickel extracted by leaching from samples in the four groups is set out in the table.

TABLE

SUMMARY OF NICKEL EXTRACTIONS, VENEZUELAN SERPENTINE

| Roast Conditions | | | | % Ni Extraction | | | | Δ % Ni Extraction | | |
|---|---|---|---|---|---|---|---|---|---|---|
| % FeS$_2$ | Max. Ore Temp. °F. | Feed Rate lbs/hr | Ret. Time mins. | BLSL | LBSL | BL | NL | BLSL -NL | BL -NL | Range BLSL |
| 0.3-0.8 | 1300 | 100 | 90 | | | (3) 82.5 | (3) 75.6 | | (3) 6.9 | |
| 0 | | | | (5) 75.6 | | (5) 72.9 | (5) 65.8 | (5) 9.8 | (5) 7.1 | |
| 1.24 | 1290 | 100 | 90 | (6) 86.6 | | | (6) 76.1 | (6) 10.5 | | 84.6-88 |
| 2.4 | 1250 | 100 | 90 | (7) 87.0 | | (7) 82.1 | (7) 73.2 | (7) 13.8 | (7) 8.9 | 83.9-89.0 |
| 2.4 | 1290 | 100 | 90 | (37) 87.5 | (13) 84.2 | | (37) 78.2 | (37) 9.3 | | 83.6-89.7 |
| 2.4 | 1300 | 100 | 90 | | (3) 85.8 | (10) 82.8 | (10) 76.1 | | (10) 6.7 | 85.4-88 |
| | | | | (3) 87.0 | (3) 87.4 | | (3) 76.9 | (3) 10.1 | | |
| 2.4 | 1300 | 100 | 90 | | (6) 84.4 | (3) 84.2 | (3) 78.4 | | (6) 5.8 | 83.6-85.8 |
| | | | | | | | (6) 77.8 | | | |
| 2.4 | 1350 | 100 | 90 | | (1) 79 | (2) 80.9 | (2) 78.2 | | (2) 2.7 | |
| 2.4 | 1400 | 100 | 60 | | (1) 83.5 | (4) 81.2 | (4) 78.8 | | (4) 2.4 | |
| 2.4 | 1290 | 200 | 90 | (6) 85.0 | | | (6) 76.6 | (6) 8.4 | | 83.1-86.5 |
| 2.4 | 1310 | 200 | 90 | | (1) 83.6 | (2) 83.2 | (2) 79.4 | | (2) 3.8 | |
| 2.4 | 1305 | 200 | 60 | | (1) 83.9 | (2) 84.5 | (2) 78.6 | | (2) 5.9 | |
| 2.4 | 1315 | 100 | 90 | | | (4) 81.7 | (4) 77.6 | | (4) 4.1 | |
| 2.4 | 1310 | 100 | 90 | | (3) 74.5 | (2) 75.5 | (2) 72.6 | | (2) 1.8 | |
| 2.4 | 1310 | 100 | 60 | | (1) 87.1 | | (1) 76.2 | | | |
| 2.4 | 1300 | 100 | 60 | | | (3) 83.4 | (3) 79.8 | | (3) 3.6 | |
| 2.4 | 1300 | 100 | 60 | | | (2) 82.4 | (2) 76.1 | | (2) 6.3 | |
| 2.4 | 1300 | 100 | 60 | (5) 85.2 | | | (5) 77.8 | (5) 7.4 | | 83.5-86.3 |
| 4.8 | 1305 | 100 | 90 | | | (2) 85.3 | (2) 80.3 | | (2) 5.0 | |
| 4.8 | 1300 | 100 | 90 | | | (11) 84.8 | (11) 81.2 | | (11) 3.6 | 86.7-88.2 |
| 4.8 | 1300 | 100 | 90 | | (4) 87.4 | | | | | |
| 4.8 | 1290 | 200 | 90 | (4) 85.1 | | | 76.6 | (4) 8.5 | | 83.4-85.7 |

( ) number of leaching tests carried out.

The benefits from attrition and soaking are apparent. The least improvement in nickel extraction resulting from operation BLSL over NL is 7.4 percent and the most 13.8 percent. The weighted average of the increase in nickel extraction of operation BL over NL is 5.4 percent.

What I claim as new and desire to protect by letters patent of the United States is:

1. In the process in which nickeliferous lateritic and garnieritic ore particles containing in excess of about 5% magnesium by weight are treated to reduce nickel values therein to metallic form and the reduced particles are quenched in an aqueous ammoniacal ammonium carbonate solution then are leached with a like solution in the presence of free oxygen to extract nickel values and dissolve them in the leach solution, the improvement which comprises subjecting quenched particles to attrition in order to rub off an outer layer therefrom and to expose surfaces beneath said layer to penetration by the quench solution whereby the proportion of nickel extracted in the leaching operation is substantially increased.

2. The process as claimed in claim 1 further including mixing the lateritic and garnieritic ore particles, prior to the reduction step with a sulphur-bearing additive added in amount sufficient to provide a sulphur content in the mixture of between about 0.2 and about 5 percent by weight.

3. The process as claimed in claim 2 wherein said additive is pyrite.

4. The process as claimed in claim 1, wherein the quenched particles prior to attrition are soaked in an aqueous ammoniacal ammonium carbonate solution in the absence of a free oxygen-containing gas for a period of about 3 hours or longer.

5. The process as claimed in claim 1, wherein the quenched particles, following attrition, are soaked in an aqueous ammoniacal ammonium carbonate solution in the absence of a free oxygen-containing gas for a period of about 3 hours or longer.

6. The process as claimed in claim 1, wherein the quenched particles both prior to and following attrition are soaked in an aqueous ammoniacal ammonium carbonate solution in the absence of a free oxygen-containing gas for a period of about 3 hours or longer.

7. In the process in which nickeliferous lateritic and garnieritic ore particles containing in excess of about 5% magnesium by weight are treated to reduce nickel oxides therein to metallic form and the reduced particles are quenched in aqueous ammoniacal ammonium carbonate solution then are passed to a first leach stage in which they are leached with a like solution in the presence of free oxygen after which the resulting first stage leach residue is separated from solution and is passed to a second leach stage in which it is leached with a like solution in the presence of free oxygen and part of the resulting second stage leach solution separated from the residue is recycled to the leaching operation the improvement which comprises subjecting the first stage leach residue to attrition in order to rub off an outer layer therefrom and to expose surfaces beneath said layer to penetration by the quench solution whereby the proportion of nickel extracted in the leaching operation is substantially increased.

8. The process as claimed in claim 7 further including mixing the lateritic and garnieritic ore particles, prior to the reduction step with a sulphur-bearing additive added in amount sufficient to provide a sulphur content in the mixture of between about 0.2 and about 5 percent by weight.

9. The process as claimed in claim 7 wherein said additive is pyrite.

10. The process as claimed in claim 7, wherein the quenched particles prior to attrition are soaked in an aqueous ammoniacal ammonium carbonate solution in the absence of a free oxygen-containing gas for a period of about 3 hours or longer.

11. The process as claimed in claim 7, wherein the first stage leach residue following attrition is soaked in an aqueous ammoniacal ammonium carbonate solution in the absence of a free oxygen-containing gas for a period of about 3 hours or longer.

12. The process as claimed in claim 7, wherein the quenched particles both prior to and following attrition are soaked in an aqueous ammoniacal ammonium carbonate solution in the absence of a free oxygen-containing gas for a period of about 3 hours or longer.

* * * * *